Figure 1:
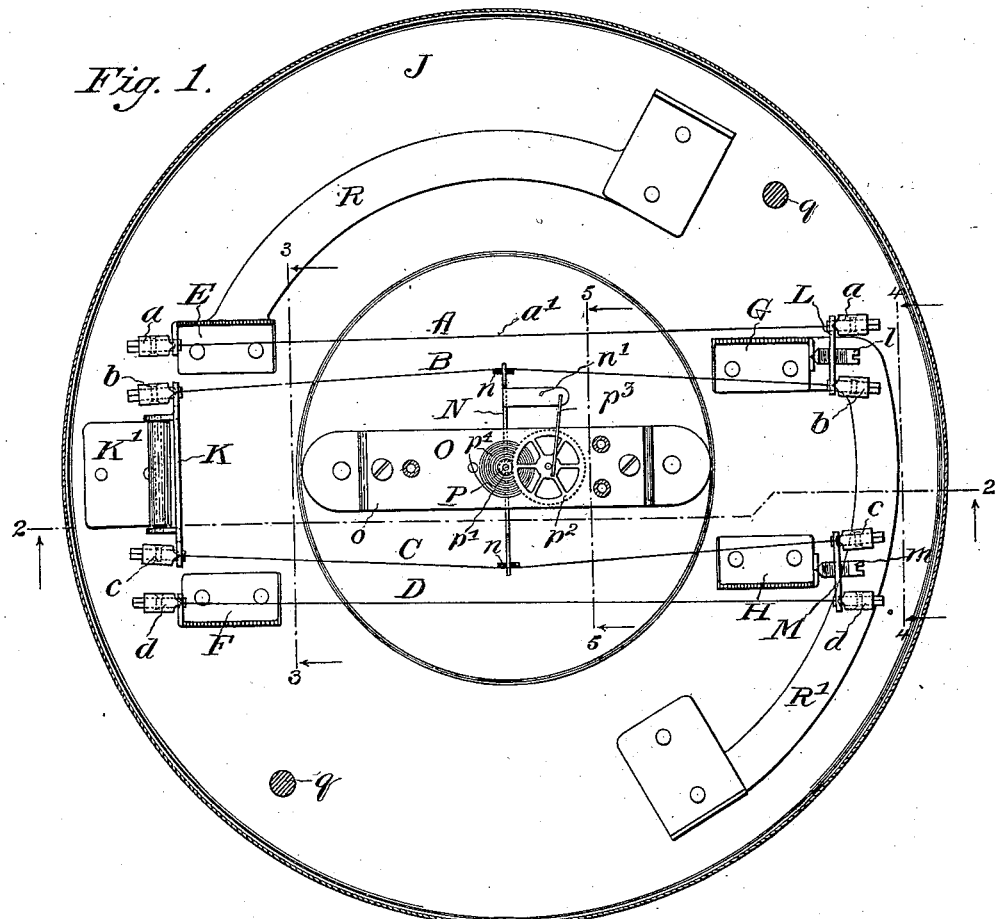

W. JANDUS.
MEANS FOR CONVERTING ELECTRICAL ENERGY INTO MECHANICAL MOVEMENT.
APPLICATION FILED NOV. 24, 1902.

992,427.

Patented May 16, 1911.

3 SHEETS—SHEET 1.

WITNESSES:
G. W. Saywell
A. C. Merkel

INVENTOR:
Wm Jandus,
by his attorney
J. D. Fay

W. JANDUS.
MEANS FOR CONVERTING ELECTRICAL ENERGY INTO MECHANICAL MOVEMENT.
APPLICATION FILED NOV. 24, 1902.
992,427.
Patented May 16, 1911.
3 SHEETS—SHEET 2.
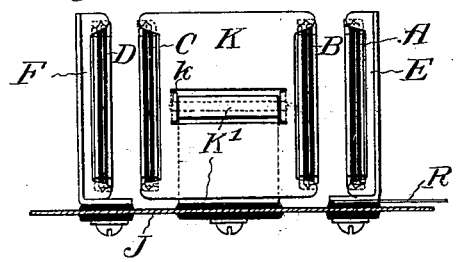
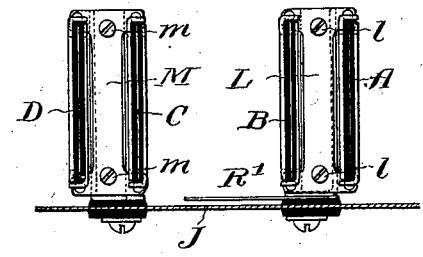
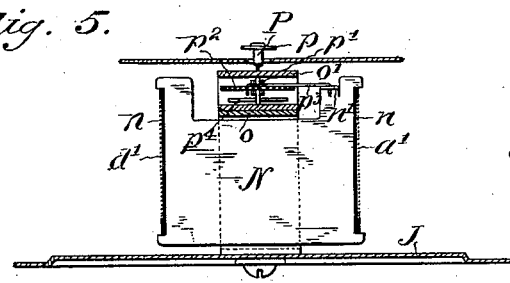
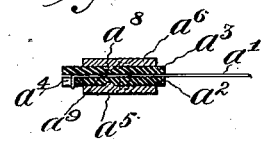
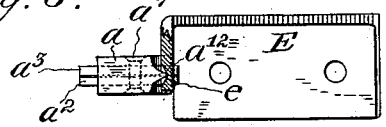
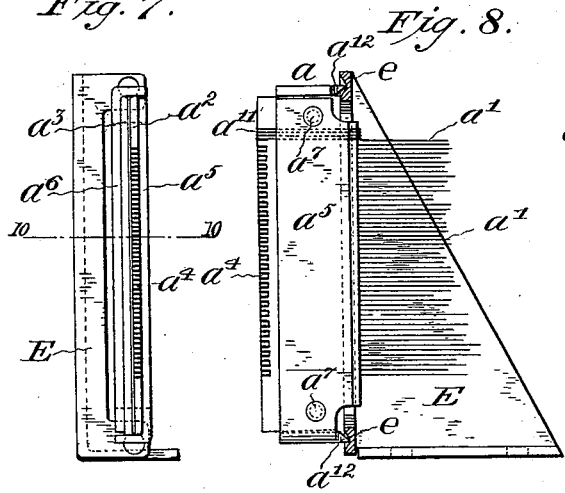
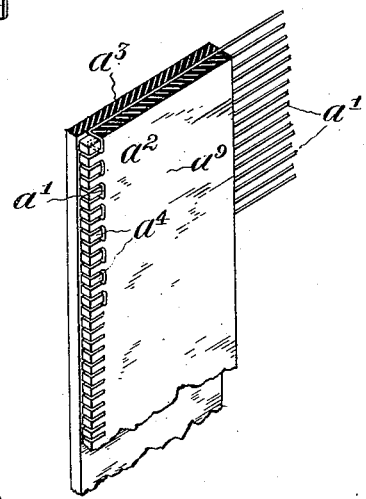
WITNESSES:
G. W. Saywell
N. C. Merkel
INVENTOR:
Wm. Jandus,
by his attorney,
J. B. Fay W. JANDUS.
MEANS FOR CONVERTING ELECTRICAL ENERGY INTO MECHANICAL MOVEMENT.
APPLICATION FILED NOV. 24, 1902.

992,427.

Patented May 16, 1911.

3 SHEETS—SHEET 3.

WITNESSES:
G. W. Saywell
A. E. Merkel.

INVENTOR:
Wm Jandus,
by his attorney
J. D. Fay

THE NORRIS PETERS CO., WASHINGTON, D. C.

UNITED STATES PATENT OFFICE.

WILLIAM JANDUS, OF CLEVELAND, OHIO.

MEANS FOR CONVERTING ELECTRICAL ENERGY INTO MECHANICAL MOVEMENT.

992,427.    Specification of Letters Patent.    Patented May 16, 1911.

Application filed November 24, 1902. Serial No. 132,540.

*To all whom it may concern:*

Be it known that I, WILLIAM JANDUS, a citizen of the United States, resident of Cleveland, county of Cuyahoga, and State of Ohio, have invented a new and useful Improvement in Means for Converting Electrical Energy into Mechanical Movement, of which the following is a specification, the principle of the invention being herein explained and the best mode in which I have contemplated applying that principle, so as to distinguish it from other inventions.

My invention relates to means for converting electrical energy into mechanical movement by means of the expansion of an electrical conductor resulting from the heat generated by its resistance to the flow of an electric current, and particularly to means for so converting the electrical energy for application to electrical measuring and regulating instruments.

The object of the invention is to provide means of this character wherein it shall be possible to obtain a comparatively large amount of power resulting from the expansion of the electrical conductor, and thereby permit of the application of the "hot-wire" construction in a more advantageous manner than that in which it heretofore has been applied and to devices in which the use has heretofore been prohibited. This object is accomplished primarily by the application and use of an electro-thermic element suitably supported and consisting of two base-members and a multiplicity of conductor-members suspended between said base-members and connected in series, these conductor-members being arranged when expanded, to act simultaneously and collectively upon such base-members and independently of each other.

Said invention as embodied in a measuring instrument is hereinafter fully described and specifically set forth in the claims.

The annexed drawings and the following description set forth in detail one mode of carrying out the invention, such disclosed mode constituting but one of various ways in which the principle of the invention may be used.

Figure 2:
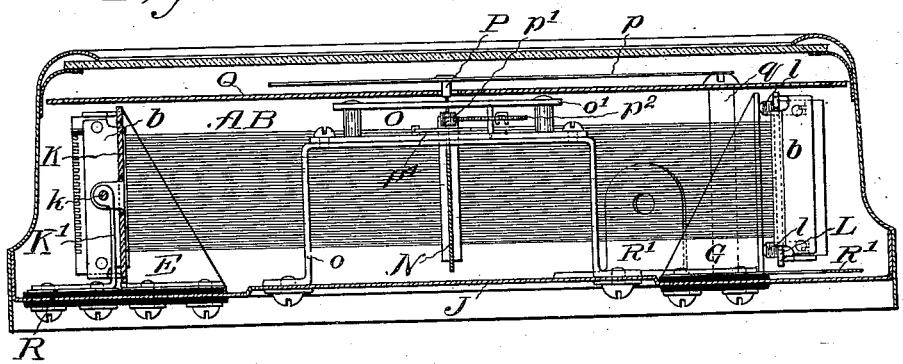
Figure 12:
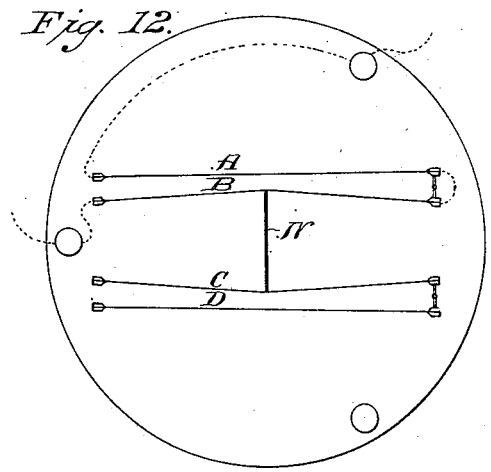
Figure 16:
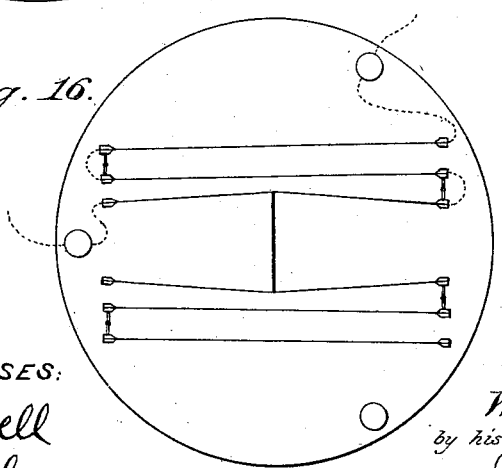

In said annexed drawings: Figure 1 represents a top plan view of a volt-meter embodying my invention, with the dial and supporting plate therefor removed to disclose the main portion of the actuating mechanism. Fig. 2 represents a vertical section of such volt-meter taken upon the planes indicated by the lines 2—2, Fig. 1 and viewed in the direction indicated by the arrow in said figure. Fig. 3 represents an end view of the actuating mechanism viewed from the left of the instrument as illustrated in Fig. 1. Fig. 4 represents an end view of said mechanism viewed from the right of the instrument as illustrated in said figure. Fig. 5 represents a vertical section of said mechanism taken upon the plane indicated by line 5—5, Fig. 1, and viewed in the direction indicated by the arrow in said figure. Fig. 6 represents a plan view, partly in section, on an enlarged scale, of one of the supports for supporting one end of the electro-thermic elements forming a part of my invention, showing also in plan one base-member of such element mounted on said support. Fig. 7 represents an end elevation, on such enlarged scale, of said support and base-member. Fig. 8 represents an enlarged side elevation of one end of such electro-thermic element, mounted upon such support, the latter being shown in section at the plane of support of the base-member. Fig. 9 represents an enlarged perspective view of a portion of one of the electro-thermic elements with parts removed to show the manner of securing the conductor to the base-members. Fig. 10 represents a horizontal section of one end of such thermo-electric element taken in the plane indicated by line 10—10, Fig. 7. Fig. 11 represents a section similar to that shown in Fig. 10, of a modified form of electro-thermic element. Figs. 12, 13 14 and 15 are diagrams illustrating various ways of using the instrument to obtain various results. Fig. 16 is a diagram of a modified construction which may be employed in applying the principle of my invention.

The electro-thermic elements each of which constitutes the fundamental factor of my invention and by means of the use of which the invention embodied in the voltmeter illustrated is carried out, are two in number, A and B, Fig. 1. Element A consists of supporting means hereinafter described, two base-members $a$ $a$ and a continuous conductor $a'$ consisting of fine metal wire of high electrical resistance suspended between and supported by said base-members as will be further described. Each such base-member consists of two juxtaposed plates $a^2$ and $a^3$, Fig. 9, of insulating material forming the inner member of the base-member, and two clamping plates $a^5$ and $a^6$ forming the outer member thereof. The edge of one of these plates $a^2$ is notched, as shown, to form a series of lugs $a^4$. The conductor is wound back and forth upon the plates, passing between the latter and around the lugs $a^4$, as shown. Upon the outside of these two plates are clamped the two sheet plates $a^5$ and $a^6$ secured by means of rivets $a^7$ passing therethrough. The inner surface of each such clamp-plate is provided with a rib $a^8$ which engages a groove $a^9$ cut in the juxtaposed insulating plate $a^2$, Fig. 10. This groove permits tension to which the plates $a^2$ and $a^3$ are subjected in the direction of the conductor $a'$ to be transmitted to the stronger steel clamp-plates. This construction may be modified by providing the clamp-plates with flanges $a^{10}$, Fig. 11, the essential requirement being that there shall be engaging surfaces on the clamp and insulating plates which lie transversely of the direction of tension and of sufficient length to evenly distribute the tension to the clamp-plates. A terminal $a^{11}$ is formed by winding a free end of the conductor around the outside of one of the insulating plates as shown in Fig. 8 which is connected with the clamp-plate on such insulating plate by contact. The other free end of the conductor is similarly arranged to form a terminal connected with the other base-member as will be understood. The conductor, being so wound, forms a multiplicity of conductor members in series. The manner of fastening them to the base-members renders each immovable upon the latter so that each may pull upon such base-members independently of all the others. The winding and preparation of these elements is further such that when the base-members are normally suspended, each conductor member is under the same amount of tension. Such construction may be brought about during the construction of the element by placing the base members so as to form the two sides of a rectangle, passing a current through the conductor members and then stretching the latter while hot in a direction parallel with the other two sides of the rectangle. The wire upon subsequently cooling becomes set, so that thereafter the tension on all the wires may be made equal by placing the two base members in the position which they occupied at the completion of the stretching operation, and the supports for the base-member are arranged as will hereinafter appear to impart such position and the necessary tension to said members. It is therefore seen that when the conductor members are contracted or expanded the effect of each such conductor member upon the base members is simultaneous, the total result is the collective effect of all the members and each member acts independently of all the others. Since the tensile strength of the element is equal to the sum of the tensile strengths of each conductor member, it is evident that the full thermic effect of the current may be obtained and expressed in force, the output of power being limited only by the limit of elasticity of the member. This amount of power is so much in excess of that needed for actuating the indicating mechanism, that I am enabled to reduce both the tension of the wire elements and the heat of expansion far below the safe limits to be observed in order to prevent deterioration and still obtain more than sufficient force to easily operate the said indicating means. This, of course, depends upon the number of conductor members. In practice I make this number such as to give a desired predetermined resistance. This should be such as to cause the conductor to transmit a current not exceeding a maximum of $\frac{1}{10}$ ampere. Each such member is of such a character and diameter that its electrical resistance will be equal to that of every other conductor member, whereby it is seen that the amount of expansion for a given change of temperature of the conductor members will be equal in each. Thermo-electric element B is of a construction exactly similar to that of element A just described.

In addition to the two electro-thermic elements A and B two thermic elements C and D are provided. These elements C and D are made exactly like elements A and B, but, as will appear hereinafter, are not connected so as to be capable of introduction into an electric circuit, hence are expanded and contracted by changes of temperature of their environment only. Such being the case, no insulating material need be used in the base-members of the thermic elements, as will be understood.

Two pairs of rigid oppositely disposed supports or standards E, F and G, H are secured to and insulated from the bottom or base plate J of the voltmeter, and between standards E and F is placed an equalizing support K mounted upon a horizontal pintle $k$, as will be further explained. Standard E is provided upon its end with bearing grooves $e$, Figs. 6 and 8, in which rest pivot points $a^{12}$ $a^{12}$ formed upon the clamp plates $a^5$ and $a^6$ respectively, so that the base-members a of element A resting on those supports respectively, may oscillate in a plane transverse to such base-members as will be understood from the drawing. The clamp plates of all the members of all the elements A, B, C and D are formed with those pivot points as shown, so that base member d of element D oscillates upon standard F. A plate L supported upon two pivot screws l l, carries the two base-members a and b of elements A and B, such two members being mounted upon such plate to oscillate in the manner of the base member a mounted upon standard E, the two pivot screws l l, being oscillatory on standard G which latter is provided with bearing grooves for such purpose, as will be observed from the drawing. It will therefore be seen that each base-member is supported either directly or indirectly upon the outer side of their respective standards. Similarly standard H carries two base-members c and d of the elements C and D, plate M and screws m m. The remaining two base-members b and c of elements B and C are mounted in a similar manner upon the oscillatory equalizing support K as shown in Fig. 1. This support K is mounted at its central portion upon an upright equalizing spring-support K' which is secured to and insulated from the base plate J, as shown in Fig. 2. It is therefore seen that by means of the pivot screws l l and m m, the conductor elements of each may be stretched and brought into a condition of tension determined by the tension in the spring support K', against which latter the said screws act in effecting such tension. It will also be seen that by withdrawing the pivot-screws l and m the conductor elements may be sufficiently relaxed to enable the electro-thermic elements to be readily and easily removed for repairs or may be readily replaced. The oscillatory axis of support K is so placed that the amount of tension above and below the horizontal plane passing through such axis, is equalized whereby the support K and base members b and c supported thereon always move in parallel lines during the movement of spring K'. This permits the tension in the conductor members of elements B and C to always be equal to each other, which as before stated is a feature of each element necessary to effect simultaneous and collective action on the part of the conductor member when expanded or contracted. Since the movement of spring support K' is very slight, the amount of pull exerted by it does not vary substantially so that the amount of such tension in elements A and B remains substantially the same for all variations of the length of the elements. The base-elements supported upon the oscillatory plates L and M by virtue of construction of the latter primarily move in parallel lines since they are mounted upon rigid supports G and H. Supports E and F being rigid the plane of support of the base-members a and d supported thereby always maintains a fixed position relatively to such supports.

Elements A and B together with their supports form an expanding and contracting device which I will designate as device A B having the following characteristics, namely: that any movement occasioned by the contraction or expansion of the one electrothermic element is transmitted to the other through the medium of oscillatory plate L; that it consists of two expansible and contractible elements each one of which embodies a multiplicity of conductor elements in series adapted to act simultaneously and independently of each other upon their supports. Elements C and D together with their supports form a second expanding and contracting device which I will designate as CD, which, as illustrated, is an exact duplication of the expanding device including elements A and B, these two devices being substantially parallel with each other. It is therefore seen that the two expanding and contracting devices have an amount of contraction and expansion equal to each other for given variations in temperature, which in this instrument is a required characteristic. Said equality is preferably effected by making these devices in duplicate, as shown and described.

Suspended between and supported by elements B and C is a connecting stiff or rigid metallic plate or diaphragm N of a length such as to normally impart a flexure, as shown, to such two elements, and to place these elements into differential opposition to each other as regards thermic effects. Such diaphragm is provided with two insulating strips n n which directly support the conductor elements and prevent short-circuiting of the current as will be understood. This diaphragm swings free from contact with other parts of the instrument and is hence free to move back and forth in a direction transverse relatively to said elements.

Since the expanding and contracting devices have, as a result of their construction, an equal amount of contraction and expansion for given variations in temperature, it will be seen that the connecting plate N is normally caused to occupy a fixed position relatively to the two devices throughout all variations of temperature of the surrounding atmosphere or parts, to which such devices are simultaneously subjected, a change in the one due to changes of temperature being compensated for by a like change in the other due to the same change.

As illustrated and as will be further described in detail, in one form of voltmeter, device AB is electrically connected whereby it may be introduced into a circuit the potential of whose current it is desired to measure. In this case device C D is electrically independent of device AB, and together with diaphragm N forms means for normally imparting a flexure to element B of said device AB. Upon the central portion of base-plate J, independently and intermediately of the two devices AB and CD, is secured a frame O consisting of a base-portion $o$ spanning diaphragm N and a top portion or plate $o'$. An arbor P is mounted in this frame and projects upwardly through the dial Q which is supported by posts $q$, Figs. 1 and 2. An indicating pointer $p$ is secured to the upper end of such arbor. Upon such arbor is secured a pinion $p'$ which meshes with a gear-wheel $p^2$ mounted in the frame. This gear is connected with an arm $n'$ formed upon diaphragm N by means of a link $p^3$. A fine spiral spring $p^4$ is mounted upon frame O and connected with arbor P for the purpose of taking up any lost motion which may result from the imperfect coöperation of the meshing of the gear teeth on pinion $p'$ and gear $p^2$. It is thus seen that movement on the part of diaphragm N will be imparted to the indicating means consisting of the above-described elements, and definitely indicated upon the dial by the pointer $p$ and that these indicating means, being mounted independently upon the base-plate are not effected by atmospheric variations of temperature to which the instrument may be subjected.

Devices AB and CD and the diaphragm N therefor comprise means for actuating the indicating means. The equalizing spring K' is electrically connected, as will be observed, with the terminal of the wire conductor of element B through the medium of the clamp-plates of said element, the equalizing plate support K, and pintle $k$ and is utilized as one of the terminals of the instrument. Standard E is connected with a terminal conductor R insulated from the base-plate J, shown in Figs. 1 and 2. Standard G is electrically connected with a terminal conductor R' which is hence connected with the two terminals of elements A and B through the medium of plate L and screws $l$ $l$. It will therefore be seen that by connecting the spring-plate K' and the terminal conductor R with the terminals of an electric circuit, elements A and B may be introduced into such circuit in series and by connecting K' and R with one such terminal and conductor R' with the other, these elements may be introduced into said circuit in parallel.

The above described mechanism is suitably incased and may be adapted by means of various connections and slight changes, for use in measuring potential of widely different degree, and also for measuring current and resistance.

Figure 13:
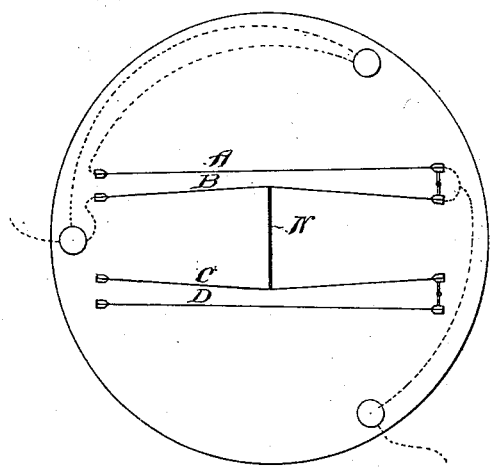
Figure 15:
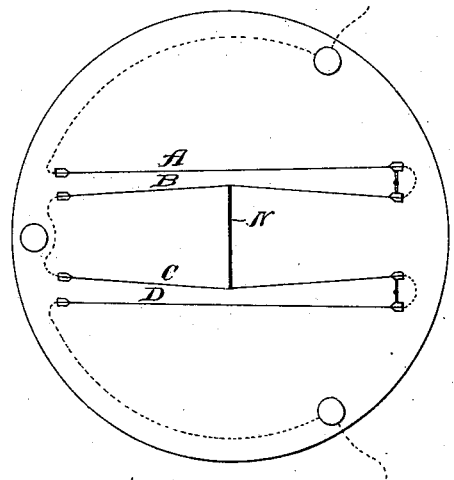

I shall now proceed to describe the arrangement and operation of the mechanism when connected up in a few different ways for different purposes. The connections for the instrument when said elements A and B are connected in series are illustrated diagrammatically in Fig. 12. In this case, the current passes through the conductors members which, becoming heated, expand and permit the device CD to reduce its flexure and so move the connecting diaphragm N toward device AB. Such movement hence produces a movement of the indicating pointer which by the aid of suitable indicating lines on the dial, will, as will be readily understood, indicate the voltage of the current. It is thus seen that the movement due to the elongation of the member A is transmitted through the oscillatory plate L so that double the amount of movement is obtained for actuating the pointer, than would be obtained with but a single element, within the length of such single element. In the instrument arranged as shown in said diagram, it is seen that the expansion of the element depends directly upon the cross-section and the length of the wire which two factors determine the resistance and hence the heat resulting therefrom. Assuming that the resistance of the elements A and B is such that when connected in series through the terminals R and K', 200 volts potential will swing the pointer to the full limit of the dial, now if the elements A and B be connected up in parallel as shown in Fig. 13, the resistance of the elements is one-fourth the previous resistance, since the length of the conducting medium has been halved and the cross-sectional area doubled. A 50-volt circuit will hence suffice to swing the indicator to the full limit of the dial and the instrument may hence be advantageously used for measuring current potential not exceeding 50 volts. If the conductor elements of one element be placed in parallel with each other instead of in series by discarding insulation in the base-members thereof, the resistance of such an element will be reduced directly as the number of conductor members and inversely as the length of the members so paralleled, that is, if there are fifty such conductors, whose resistance while in series was 2500 ohms, they now have 1/50th of the length and 50 times the cross-sectional area and their resistance is therefore one ohm. Such an element is adapted to measure current strength or amperes.

Figure 14:
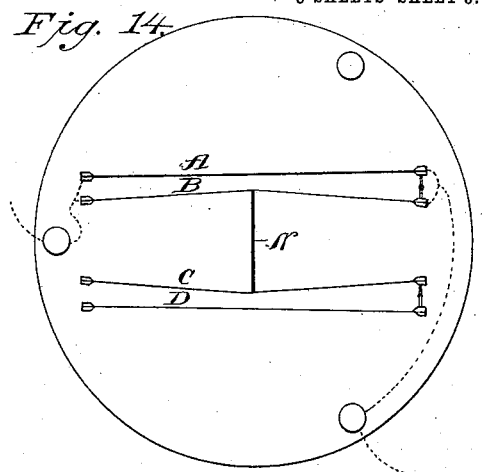

In diagrammatic Fig. 14, element A is shown so arranged, its conductor members being connected in parallel, as indicated by the heavy line, to measure current strength;

element B has its members, as heretofore, connected in series for measuring potential. Now if these elements are placed in circuit in series with each other it is apparent that the current will spend its thermic effect on element B, element A whose members are in parallel being practically unaffected. The instrument under such conditions may hence be used as a volt-meter. If, however, the two elements A and B be placed in the circuit in parallel, as shown, the current will spend its thermic effect on element A which has very little resistance, while no appreciable amount of current will pass through the element B of high resistance which will remain cold. Under these conditions the instrument may, as will be seen, be used as an ammeter. By changing elements C and D from thermic to electro-thermic and by introducing both devices AB and CD into the circuit and making elements A, B, C and D all of different resistances, a number of differential effects may be produced, as will be readily seen, according as they are connected. One such method of connection is ilustrated in Fig. 15 in which all the elements are placed in series in the circuit. If it is desired to obtain an increased amount of movement, each device may be caused to consist of three or more electro-thermic elements arranged in mechanical series by the use of additional oscillatory plates and supports as indicated in Fig. 16. To eliminate any errors of reading due to induction, the winding of the electro-thermic elements is such as to render them non-inductive, such effect being obtained by the winding above described.

Other modes of applying the principle of my invention may be employed instead of the one explained, change being made as regards the mechanism herein disclosed provided the means stated by any one of the following claims or the equivalent of such stated means be employed.

I therefore particularly point out and distinctly claim as my invention—

1. In apparatus of the class described, the combination with suitable supporting means, of an actuating element consisting of two base-members mounted upon said supporting means so as to be oscillatory about angularly related axes, and a sensitive member fixed to and supported between such members.

2. In means for converting electrical energy into mechanical movement, the combination with suitable supporting means, of an electro-thermic element consisting of two oscillatory base-members mounted upon said supporting means and a conductor consisting of a plurality of members fixed to and suspended between said base-members, the axis of oscillation of one of the latter being transverse relatively to the plane of said conductor members.

3. In means for converting electrical energy into mechanical movement, the combination with suitable supporting means, of an electro-thermic element consisting of two oscillatory base-members mounted upon said supporting means and a multiplicity of members connected in series to form continuous electrical conductor, and having their ends rigidly secured to such base-members.

4. In means for converting electrical energy into mechanical movement, the combination with suitable supporting means, of an electro-thermic element consisting of two base members mounted upon said supporting means so as to be oscillatory about angularly related axes and a multiplicity of conductor-members connected in series electrically, and having their ends fixedly secured to such base members.

5. In means for converting electrical energy into mechanical movement, the combination of supporting means, two flexible expansible and contractible devices, and a rigid member interposed between such devices, of a length such as to impart tension to the latter.

6. In means for converting electrical energy into mechanical movement, the combination of supporting means, two flexible expansible and contractible devices, and rigid means connecting such devices, of a length such as to impart tension to the latter, such two devices having equal amounts of contraction and expansion for given variations in temperature.

7. In a means for converting electrical energy into mechanical movement, the combination of supporting means, two flexible expansible and contractible devices, a rigid member interposed between such devices, of a length such as to impart tension to the latter, and indicating mechanism connected with said member.

8. In means for converting electrical energy into mechanical movement, the combination with two flexible expansible and contractible devices each arranged to expand or contract equally for the same temperature variation, of a connecting plate supported by said devices so as to be freely suspended between them and to impart a flexure thereto.

9. In means for converting electrical energy into mechanical movement, actuating means comprising two expansible and contractible devices suitably supported and a rigid plate connected with and inserted between said devices to effect a flexure in the latter and supported thereby.

10. In means for converting electrical energy into mechanical movement, actuating means comprising two expansible and contractible devices suitably supported and a plate connected with and inserted between said devices to effect a flexure in the latter, one of said devices being connected so as to be capable of conducting an electric current.

11. In means for converting electrical energy into mechanical movement, actuating means comprising two expansible and contractible devices suitably supported and a plate suspended between and supported by said devices, and forming a flexure in each of same, one of said devices being connected so as to be capable of conducting an electric current.

12. In means for converting electrical energy into mechanical movement, actuating means comprising two sets of wires independently supported, and a plate of greater width than the normal distance between said two sets of wires and engaging the latter, whereby the wires in each set are given a flexure.

13. In means for converting electrical energy into mechanical movement, actuating means comprising two sets of wires independently supported, and a plate engaging and supported by the latter, said plate being of a width such as to impart a flexure to both such sets.

14. In means for converting electrical energy into mechanical movement, actuating means comprising the combination with two duplicate sets of wires suitably supported, of a plate suspended and supported between such sets, each of the latter consisting of two elements each comprising a series of expansible and contractible members secured at their ends to two transverse base members, such two elements being connected and arranged in a manner such that motion of the one due to contraction or expansion may be transmitted to the other.

15. The combination of two terminal conductors, two expansible and contractible conductors, each having one end connected with such terminal conductors respectively, and means for supporting said expansible and contractible conductors, such latter means including an oscillatory member, the other ends of such expansible and contractible conductors being mounted upon said oscillatory member; a third terminal conductor, and means connected with one of said expansible and contractible members for normally effecting flexure therein, said oscillatory member being electrically connected with both said expansible and contractible members and with said third terminal conductor.

16. The combination of two terminal conductors, two expansible and contractible conductors each consisting of two base members and a multiplicity of wires supported between them connected in series, supports for carrying the base members of these expansible and contractible conductors, two of such base members being mounted upon an oscillatory plate which is itself mounted upon one of said supports, and a third terminal conductor, said first two terminal conductors, wire and plate being connected in series, and said third terminal conductor being electrically connected with said plate.

17. In means for converting electrical energy into mechanical movement, an electro-thermic element consisting of two base members suitably supported and each electrically connected with its respective support, and a multiplicity of conductor members connected in series and suspended between said base members to form a continuous conductor, one terminal of such continuous conductor being electrically connected with one base member and the other terminal being electrically connected with the other base member.

18. In means for converting electrical energy into mechanical movement, an electro-thermic element consisting of two base members suitably supported and a multiplicity of conductor members suspended between and secured to said base members, each of the latter consisting of two outer clamp members and two inner members to which the conductor members are directly secured.

19. In means for converting electrical energy into mechanical movement, an electro-thermic element consisting of two base members suitably supported and a multiplicity of conductor members in series suspended between and secured to said base members, each of the latter consisting of two outer clamp members, and two inner members of insulating material to which the conductor members are directly secured.

20. In means for converting electrical energy into mechanical movement, an electro-thermic element consisting of two base members suitably supported and a multiplicity of conductor members under tension supported between and secured to said base members, each of the latter consisting of two outer clamp members and two inner members to which said conductor members are directly secured, said clamp and inner members having engaging surfaces transverse relatively to the direction of tension in said conductor members.

21. In means for converting electrical energy into mechanical movement, the combination with suitable supporting members, of an electro-thermic element having its respective ends pivotally mounted upon the outer side of said supporting members.

22. In means for converting electrical energy into mechanical movement, the combination of a base plate, two supports fixed to and projecting from said plate, and an electro-thermic element having its respective ends pivotally mounted upon the outer sides of said supporting members.

23. In means for converting electrical energy into mechanical movement, an electrothermic element consisting of two base members suitably supported and a multiplicity of conductor members suspended between and secured to said base members, each of the latter consisting of outer clamping means and inner clamping means to which latter the conductor members are directly attached, said members being insulated from said clamping means.

Signed by me, this 19th day of November 1902.

WILLIAM JANDUS.

Attested by—
 D. T. DAVIES,
 A. E. MERKEL.

---

Copies of this patent may be obtained for five cents each, by addressing the "Commissioner of Patents, Washington, D. C."